(12) United States Patent
Zhang et al.

(10) Patent No.: US 7,643,251 B1
(45) Date of Patent: Jan. 5, 2010

(54) SLIDER HAVING FAST TAKE-OFF FLUID BEARING SURFACE

(75) Inventors: Shuyu Zhang, Fremont, CA (US); Francis Crimi, Los Altos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 444 days.

(21) Appl. No.: 11/483,072

(22) Filed: Jul. 6, 2006

Related U.S. Application Data

(60) Provisional application No. 60/697,696, filed on Jul. 8, 2005.

(51) Int. Cl.
*G11B 5/60* (2006.01)
(52) U.S. Cl. .................................. 360/235.6
(58) Field of Classification Search ............. 360/235.4, 360/235.5, 235.6, 235.8, 236, 236.4, 236.6
See application file for complete search history.

(56) References Cited

U.S. PATENT DOCUMENTS

| | | | |
|---|---|---|---|
| 6,483,667 B1 * | 11/2002 | Berg et al. ............... | 360/235.6 |
| 6,560,071 B2 | 5/2003 | Chapin et al. | |
| 6,674,612 B2 * | 1/2004 | Boutaghou et al. ........ | 360/236.4 |
| 6,678,119 B1 | 1/2004 | Pendray et al. | |
| 6,920,015 B2 * | 7/2005 | Mundt et al. ............. | 360/235.6 |
| 6,989,965 B2 * | 1/2006 | Mundt et al. ............. | 360/235.4 |
| 7,054,108 B2 * | 5/2006 | Boutaghou et al. ........ | 360/236.5 |
| 2003/0165031 A1 * | 9/2003 | Rajakumar ................ | 360/235.6 |
| 2004/0156143 A1 * | 8/2004 | Kang ....................... | 360/235.8 |
| 2005/0280943 A1 * | 12/2005 | Inoue et al. .............. | 360/236.2 |
| 2006/0238922 A1 * | 10/2006 | Hanyu ..................... | 360/235.8 |
| 2007/0103816 A1 * | 5/2007 | Nakakita et al. ......... | 360/235.5 |

OTHER PUBLICATIONS

U.S. Appl. No. 11/241,440, filed Sep. 29, 2005, Hain-Ling Liu.
Five pages that illustrate (i) on p. 1, a slider by Seagate Technology LLC (Slider by Seagate), a slider by Maxtor Corporation (Slider #1 by Maxtor), and a second slider by Maxtor Corportation (Slider #2 by Maxtor), (ii) on p. 2, simulated mass flow for the Silder by Seagate, Slider #1 by Maxtor, and Slider #2 by Maxtor, (iii) on p. 3, simulated air bearing pressure for the Slider by Seagate, Slider #1 by Maxtor, and Slider #2 by Maxtor, (iv) on p. 4, modeled CSS landings/takeoff analysis for the Seagate slider, Slider #1 by Maxtor, and Slider #2 by Maxtor, and (v) on p. 5, altitude sensitivity for the Slider by Seagate, Slider #1 by Maxtor, and Slider #2 by Maxtor. It is believed that the Slider by Seagate and slider #2 by Maxtor was on sale or was in public use more than one year prior to the Jul. 8, 2005, priority date of the present invention. It is also believed that slider #1 by Maxtor was in public use in Jul. 2004. On p. 1, each slider includes (i) one or more air bearing surfaces (gray background with "/" surface background), (ii) one or more surfaces that are at a step down depth ( white background with "X" surface background), and (iii) one or more surface that are at a cavity depth (ligher gray background).

* cited by examiner

*Primary Examiner*—Angel A. Castro
(74) *Attorney, Agent, or Firm*—Mikel R. Boeve

(57) ABSTRACT

A disk drive for storing data includes a rotating storage disk and a slider positioned near the storage disk. The slider has a flying side and a read/write head. The flying side includes a leading bearing surface and a leading recessed surface positioned near a leading edge of the slider. The leading bearing surface can include a leading transverse section that is positioned within approximately 20 and 200 microns of the leading edge. The leading recessed surface is positioned between the leading transverse section and the leading edge. The leading bearing surface and the leading recessed surface cooperate to form a relatively high pressure area near the leading edge that facilitates a relatively rapid take-off of the slider away from the storage disk during start up of the disk drive.

32 Claims, 5 Drawing Sheets

US 7,643,251 B1

SLIDER HAVING FAST TAKE-OFF FLUID BEARING SURFACE

RELATED APPLICATION

This Application claims the benefit of U.S. Provisional Application Ser. No. 60/697,696 filed on Jul. 8, 2005. The contents of U.S. Provisional Application Ser. No. 60/697,696 are incorporated herein by reference.

BACKGROUND

Disk drives are widely used in computers, consumer electronics and data processing systems for storing information in digital form. A disk drive typically includes one or more storage disks and one or more sliders. Each slider includes a read/write head that transfers information to and from the storage disk, and one or more air bearing surfaces. With a contact start-stop (CSS) type disk drive, the slider rests on the storage disk when the storage disk is not rotating.

Rotation of the storage disk drags air under the slider. The amount of air dragged under the slider during rotation of the storage disk varies according to the rotation rate of the storage disk. When the rotation rate is greater than a take-off velocity, the slider begins to ride on an air bearing with the read/write head spaced apart a distance from the storage disk that is commonly referred to as a "fly height".

The fly height of the slider can vary according to the rotation rate of the storage disk. For example, when the storage disk is rotating below the take-off velocity, insufficient air is being dragged under the slider and the slider is contacting the storage disk. The fly height of the slider is also influenced by the one or more air bearings on the slider. Accordingly, the value of the take-off velocity will vary according to the design of the slider.

During non-rotation of the storage disk, no air flow is generated and the slider rests in a landed position on the surface of the storage disk. During start-up of the disk drive, the rotation rate of the storage disk ramps up from zero to desired operational rotation rate of the storage disk. With this design, during start up, the storage disk is dragged against the slider until the rotation rate of the storage disk ramps beyond the take-off velocity.

Unfortunately, dragging the storage disk against the slider causes wear and damage to the slider and the storage disk. This can result in inaccurate data transfers, the loss of data and/or failure of the disk drive.

SUMMARY

The present invention is directed to a disk drive having a rotating storage disk and a slider positioned near the storage disk. The slider includes a flying side that faces the storage disk and a read/write head that interacts with the storage disk to transfer information between the read/write head and the storage disk. The flying side includes a leading edge, a trailing edge that is opposite the leading edge, a first lateral side, and a second lateral side that is opposite the first lateral side.

Additionally, the flying side includes a first leading bearing surface and a first leading recessed surface. In one embodiment, the first leading bearing surface including a leading transverse section that is positioned within approximately 10 and 250 microns of the leading edge. Further, the first leading recessed surface positioned between the leading transverse section and the leading edge. With this design, in certain embodiments, the first leading bearing surface and the first leading recessed surface cooperate to form a relatively high pressure area near the leading edge that facilitates a relatively rapid take-off of the slider away from the storage disk during start up of the disk drive. This reduces the amount of time that the storage disk is dragged against the slider during startup and shut-down of the disk drive. Stated in another fashion, this reduces the take-off velocity and the take-off time and significantly improves the performance of the disk drive during start-stop operations. As a result thereof, the wear and damage to the slider and the storage disk is reduced.

In one embodiment, the first leading bearing surface is centered on a longitudinal axis of the slider.

In certain embodiments, the first leading bearing surface includes a side section and a spaced apart second side section that each extend between the leading transverse section and the leading edge. Additionally, the first leading bearing surface can include a first lateral section and a spaced apart second lateral section that each extend between the leading transverse section and the leading edge. In this embodiment, the lateral sections can be positioned between the side sections.

In alternative embodiments, the leading transverse section can be positioned between approximately 20 and 100 microns or between approximately 20 and 50 microns of the leading edge.

Moreover, the flying side can include a second leading bearing surface that is spaced apart from the first leading bearing surface, and a second leading recessed surface. In this embodiment, the second leading bearing surface can include a leading transverse section that is positioned within approximately 20 and 200 microns of the leading edge. Further, the second leading recessed surface is positioned between the leading transverse section and the leading edge. Additionally, in this embodiment, the leading bearing surfaces can be positioned on opposite sides of the longitudinal axis of the slider.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
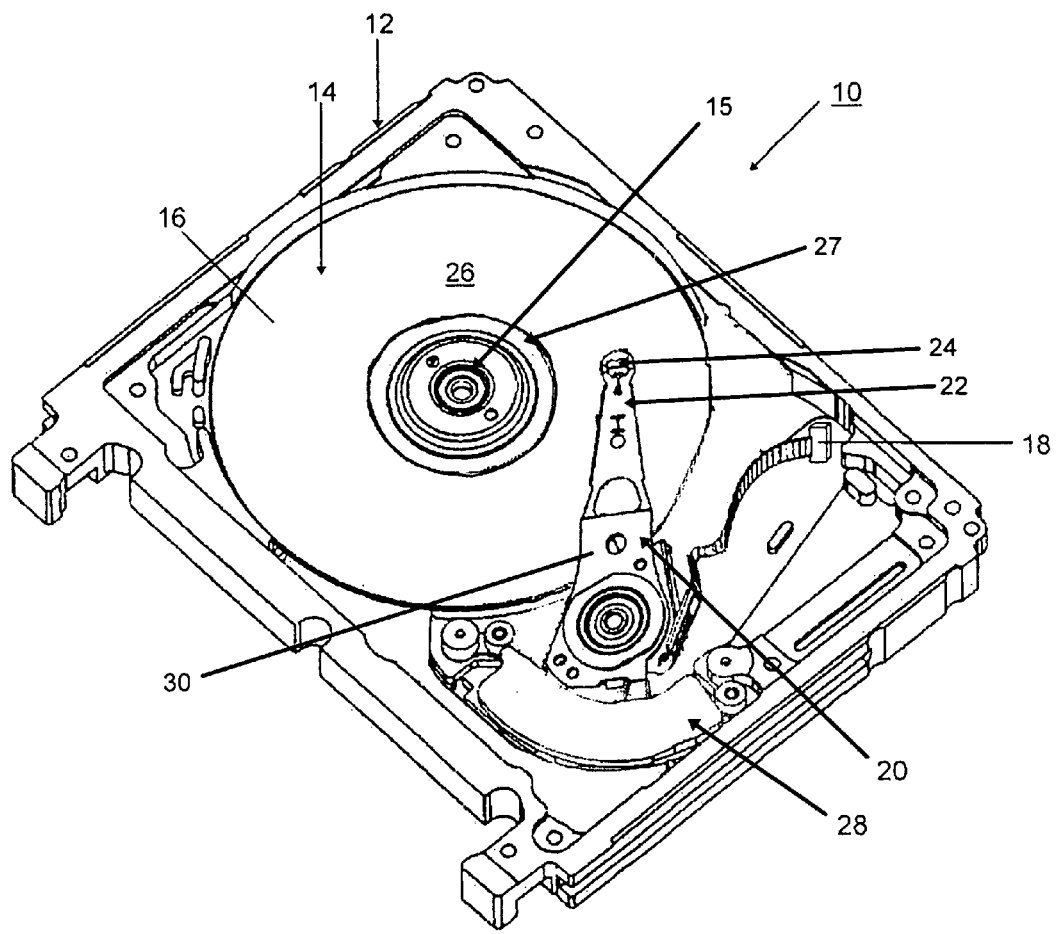
FIG. 1 is a perspective view of a disk drive having features of the present invention.

FIG. 1 illustrates a simplified perspective view of a disk drive 10 that includes (i) a drive housing 12, (ii) a disk assembly 14 having a spindle motor 15 that rotates one or more storage disks 16 about an axis of rotation, (iii) a drive circuitry 18, and (iv) a head stack assembly 20 including one or more head suspension assemblies 22, with each head suspension assembly 22 including a slider 24.

Each storage disk 16 includes one or more disk surfaces 26 that each has a plurality of concentric data tracks (not shown) that store data. Rotation of the storage disk 16 generates fluid flow near the storage disk 16. In one embodiment, each of the disk surfaces 26 includes a textured area 27 that provides an area without data for landing the slider 24. In one embodiment, the textured area 27 includes a plurality of spaced apart bumps that are between approximately 5 to 12 nm high. During non-rotation of the storage disk 16, the slider 24 lands on the bumps, and the bumps maintain the slider 24 above the rest of the storage disk 16. This reduces stiction between the slider 24 and the storage disk 16.

In one embodiment, the textured area 27 is located near in the inner diameter of the storage disk 16. Alternatively, for example, the textured area 27 could be located near the outer diameter of the storage disk 16. For example, the textured area 27 can be formed by laser texturing and the textured area 27 can also be referred to as a laser zone textured ("LZT").

The drive circuitry 18 sends and/or receives electrical current from the slider 24 during read and/or write operations of the disk drive 10. The drive circuitry 18 can include a processor and one or more preamplifiers.

The head stack assembly 20 illustrated in FIG. 1 includes an actuator motor 28, one actuator arm 30, and one head suspension assembly 22. The head suspension assembly 22 is secured to the actuator arm 30, and supports the slider 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

The slider 24 transfers information between the drive circuitry 18 and the storage disk 16. During rotation of the storage disk 16, the storage disk 16 drags air under the slider 24. The air passing under the slider 24 creates a hydrodynamic lifting force that causes the slider 24 to fly above and in close proximity to the storage disk 16.

In certain embodiments, the slider 24 is uniquely designed to rapidly takeoff from the storage disk 16 and to have a relatively low take-off velocity. Stated in another fashion, the slider 224 has improved take-off performance at lower rotational velocities of the storage disk 16. As a result thereof, the amount of time in which the storage disk 16 is dragged against the slider 24 is reduced, and the wear and tear on the slider 24 and the storage disk 16 is reduced.

Figure 2:
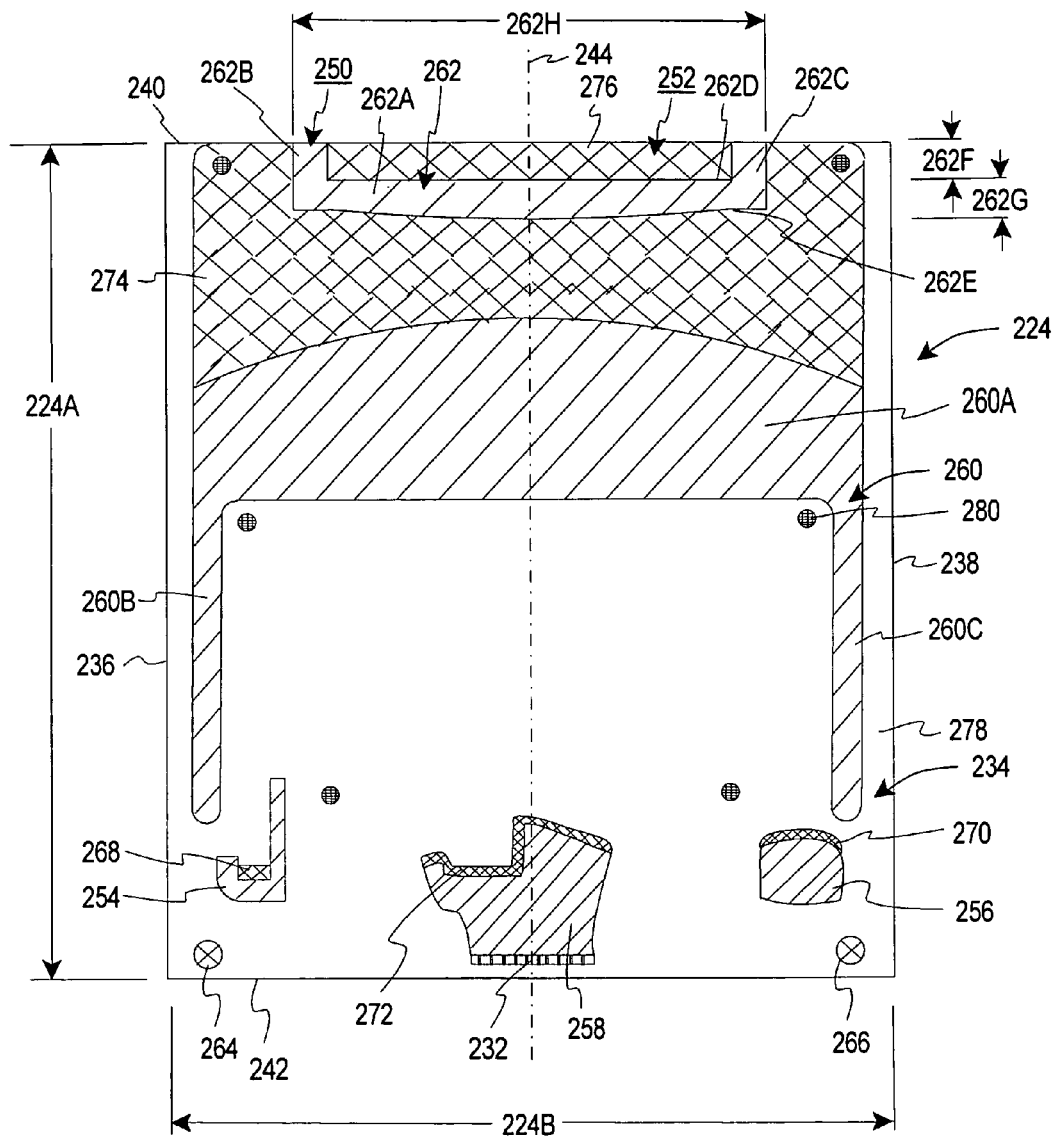
FIG. 2 is a bottom plan view of a first embodiment of a slider having features of the present invention.

FIG. 2 is a simplified, bottom view of a first embodiment of the slider 224. The design and configuration of the slider 224 can be varied depending upon the requirements of the disk drive 10. In one embodiment, the slider 224 is generally rectangular shaped and includes (i) a read/write head 232 (illustrated as a box with "II" cross-hatching) that transfers data to or from the storage disk, (ii) a flying side 234 that faces the storage disk 16 (illustrated in FIG. 1), (iii) an opposed backside (not shown), (iv) an ID lateral side that faces the axis of rotation of the storage disk 16, (v) an OD lateral side that is opposite the ID lateral side, (vi) a leading side, and (vii) a trailing side that is opposite the leading side.

The flying side 234 includes a first lateral edge 236, a second lateral edge 238 that is opposite the first lateral edge 236, a leading edge 240, and a trailing edge 242 that is opposite the leading edge 240. A longitudinal axis 244 of the slider 224 is illustrated for reference.

The composition and size of the slider 224 can vary. In one embodiment, portions of the slider 224 can be formed from materials such as alumina titanium carbide ceramic, for example. In alternative, non-exclusive examples, a slider length 224A of the slider 224 (distance between leading edge and trailing edge) can be approximately 0.5, 1, 1.1, 1.2, 1.3, 1.4, or 1.5 millimeters (mm), and a slider width 224B of the slider 224 (distance between the lateral edges) can be approximately 0.7, 0.8, 0.9, 0.94, 0.96, 0.98, or 1 millimeters (mm). However, other larger and smaller slider 224 sizes can also be used with the present invention.

The read/write head 232 includes a write element (not shown) that writes data to the storage disk 16 during a write operation and a read element (not shown) that reads data from the storage disk 16 during a read operation. In FIG. 2, the read/write head 232 is located on the longitudinal axis 244 near the trailing edge 242. Alternatively, the read/write head 232 can be positioned at other locations on the slider 224. For example, the read/write head 232 can be located on either side of the longitudinal axis 244.

It should be noted that the slider 224 typically flies at a positive pitch angle. With this design, when the read/write head 232 is positioned at or near the trailing edge 242, the read/write head 232 is located near the closest point on the slider 224 to the storage disk 16.

As provided herein, the flying side 234 of the slider 224 includes one or more surface characteristics that uniquely cooperate so that the slider 224 has improved take-off performance at lower rotational velocities of the storage disk 16. For example, the flying side 234 can include a plurality of bearing surfaces 250 (surfaces with "/" surface shading) that are defined and/or separated by one or more recessed surfaces 252 that are recessed below the bearing surfaces 250. In one embodiment, some of the recessed surfaces 252 are at a step down depth (surfaces with "X" surface shading), and some of the recessed surfaces 252 are at a cavity depth (surfaces without surface shading). Alternatively, the slider 224 can be designed so that the recessed surfaces 252 have more than two or less than two alternative depths.

In FIG. 2, different surface shadings indicate different surface depths. Moreover, areas on the slider 224 having the same surface shading have substantially similar depths.

In one embodiment, the flying side 234 includes a first rear bearing surface 254, a second rear bearing surface 256, a center rear bearing surface 258, an intermediate bearing surface 260, and one or more leading bearing surface 262. As an overview, the one or more leading bearing surfaces 262 are designed to improve the take-off performance of the slider 224. As a result thereof, the slider 224 takes off at a lower rotational velocity (e.g. has a lower take-off velocity) of the storage disk 16. Further, the design of the remaining bearing surfaces 254, 256, 258, 260 can be varied to achieve the desired flying characteristics of the slider 224. For example, the slider 224 could be designed without one or more of the remaining bearing surfaces 254, 256, 258, 260, the slider 224 could be designed with additional bearing surfaces (not shown) in addition to the remaining bearing surfaces 254, 256, 258, 260, and/or the size and shape of one or more of the remaining bearing surfaces 254, 256, 258, 260 can be changed.

In FIG. 2, the first rear bearing surface 254 is located near the first lateral side 236 and the trailing edge 242. In this embodiment, the first rear bearing surface 254 is shaped somewhat similar to a "J".

In FIG. 2, the second rear bearing surface 256 is located near the second lateral side 238 and the trailing edge 242. In this embodiment, the second rear bearing surface 256 is somewhat rectangular shaped with the top and bottom of the rectangle slightly arched.

In FIG. 2, the center rear bearing surface 258 is located near the trailing edge 242 and is substantially centered along the longitudinal axis 244. In this embodiment, the read/write head 232 is positioned near the rear of the center rear bearing surface 258.

As shown in FIG. 2, the first rear bearing surface 254 and the second rear bearing surface 256 are situated somewhat symmetrical to the longitudinal axis 244 on opposite sides of the center rear bearing surface 258. Alternatively, the center rear bearing surface 258 can be offset from the longitudinal axis 244 and/or the first rear bearing surface 254, and the second rear bearing surface 256 can be asymmetrical to the longitudinal axis 244.

In one embodiment, the center rear bearing surface 258 is closer to the trailing edge 242 than the first rear bearing surface 254, and the second rear bearing surface 256 to allow the slider 224 to roll about the longitudinal axis 244 while reducing the risk of contact between slider 224 and the storage disk 16. Further, with this design, the center rear bearing surface 258 remains the closest location on the slider 224 to the surface of the storage disk 16 during flight at relatively large roll angles.

In FIG. 2, the intermediate bearing surface 260 is positioned between the leading edge 240 and the trailing edge 242, and between the leading bearing surface 262 and the center rear bearing surface 258. In this embodiment, the intermediate bearing surface 260 is shaped somewhat similar to an inverted "U" and includes (i) an intermediate transverse section 260A that extends transversely between and slightly spaced apart from the lateral edges 236, 238, (ii) an intermediate first side section 260B that extends substantially parallel to and slightly spaced apart from the first lateral edge 236, and (iii) an intermediate second side section 260C that extends substantially parallel to and slightly spaced apart from the second lateral edge 238.

As mentioned above, the one or more leading bearing surfaces 262 improve the take-off performance of the slider 224. The design of the one or more leading bearing surfaces 262 can be varied pursuant to the teachings provided herein. In FIG. 2, the slider 224 includes a single leading bearing surface 262. In this embodiment, the leading bearing surface 262 is shaped somewhat similar to a very wide "U" with very short sides and includes (i) a leading transverse section 262A that is centered on the longitudinal axis, and extends transversely towards the lateral edges 236, 238, (ii) a leading first side section 262B that extends substantially parallel to and is spaced apart from the first lateral edge 236, and (iii) a leading second side section 262C that extends substantially parallel to and is spaced apart from the second lateral edge 238.

In FIG. 2, the leading transverse section 262A is spaced apart from the leading edge 240 a relatively small distance. In one embodiment, a transverse section leading edge 262D of the transverse section 262A is spaced apart from the leading edge 240 a distance 262F of between approximately 20 and 200 microns. Stated in another fashion, in alternative, non-exclusive embodiments, the distance 262F is between approximately 20 and 100 microns, or between approximately 20 and 50 microns. Stated in yet another fashion, in alternative, non-exclusive embodiments, the distance 262F is less than approximately 30, 40, 50, 60, 70, 80, 90, 100, 120, 140, 160, 180, or 200 microns.

Additionally, in one embodiment, a transverse section trailing edge 262E of the transverse section 262A is slightly arched. Moreover, in one nonexclusive embodiment, the transverse section 262A can have (i) a length 262G that is measured between the transverse section leading edge 262D and the transverse section trailing edge 262E of between approximately 10 and 250 microns, and (ii) a width 262H that is measured transversely between the side sections 262B, 262C of between approximately 0.35 and 1 millimeters. Stated in another fashion, in alternative, non exclusive embodiments, the transverse section 262A can have a length 262G that is less than approximately 2, 5, 10, or 20 percent of the slider length 224A, and a width 262H that is less than approximately 35, 50, 80, or 100 percent of the slider width 224B. However, different sizes of the transverse section 262A can be used.

Further, the leading first side section 262B and the leading second side section 262C are spaced apart and extend between the leading transverse section 262A and the leading edge 240.

In one embodiment, the bearing surfaces 254, 256, 258, 260, 262 are substantially coplanar with one another. Alternatively, one or more of the bearing surfaces 254, 256, 258, 260, 262 or portions of the bearing surfaces 254, 256, 258, 260, 262 can be out-of-plane or tapered with respect to the other bearing surfaces 254, 256, 258, 260, 262.

As provided above, the bearing surfaces 254, 256, 258, 260, 262 are separated and defined by one or more recessed surfaces 252. In FIG. 2, the slider 224 includes (i) a first rear recessed surface 264, (ii) a second rear recessed surface 266, (iii) a FR recessed surface 268, (iv) a SR recessed surface 270, (v) a CR recessed surface 272, (vi) an intermediate recessed surface 274, and (v) a leading recessed surface 276. Further, the remaining portions of the slider 224 are at a remaining recessed surface 278. Alternatively, the slider 224 could be designed without one or more of the recessed surfaces 252, or the slider 224 could include more recessed surfaces 252. Further, one or more of the recessed surfaces 252 could have a different size and/or shape than that illustrated in FIG. 2.

In FIG. 2, (i) the first rear recessed surface 264 is generally circular shaped and positioned near the first lateral edge 236 and the trailing edge 242, (ii) the second rear recessed surface 266 is generally circular shaped and positioned near the second lateral edge 238 and the trailing edge 242, (iii) the FR recessed surface 268 is generally rectangular shaped and positioned in front of a portion of the first rear bearing surface 254, (iv) the SR recessed surface 270 is generally arched shaped and positioned in front of the second rear bearing surface 256, (v) the CR recessed surface 272 is positioned in front of the center rear bearing surface 258, (vi) the intermediate recessed surface 274 is somewhat "U" shaped, positioned between the leading bearing surface 262 and the intermediate bearing surface 260, and surrounds the leading bearing surface 262, (vii) the leading recessed surface 276 is generally rectangular shaped and positioned between the leading transverse section 262A and the leading edge 240, and (viii) the remaining recessed surface 278 extends along the length of each lateral edge 236, 238, between the intermediate side sections 260B, 260C of the intermediate bearing surface 260 and around the rear bearing surfaces 254, 256, 258.

In FIG. 2, the first rear recessed surface 264, the second rear recessed surface 266, the FR recessed surface 268, the SR recessed surface 270, the CR recessed surface 272, the intermediate recessed surface 274, and the leading recessed surface 276 are at the step down depth and are substantially coplanar with one another. Alternatively, for example, one or more of these recessed surfaces 264, 266, 268, 270, 272, 274, 276 or portions thereof, can be out-of-plane or tapered with respect with the other recessed surfaces 264, 266, 268, 270, 272, 274, 276. In one embodiment, the step depth is approximately 0.1 to 0.3 µm (micrometers) when measured from the plane of the bearing surfaces 250. Alternatively, other step depths can be used. Still alternatively, for example, one or more of these recessed surfaces 264, 266, 268, 270, 272, 274, 276 can be at the cavity depth.

Further, in FIG. 2, the remaining recessed surface 278 is at the cavity depth. Alternatively, one or more portions of the remaining recessed surface 278 can be out-of-plane or tapered with respect to the rest of the remaining recessed surface 278 at cavity depth. In one embodiment, the cavity depth is approximately 1 to 3 μm (micrometers) when measured from the plane of the bearing surfaces 250. Alternatively, other cavity depths can be used.

The bearing surfaces 250 and the recessed surfaces 252 can be defined during fabrication of the slider 232 by photolithography processes, such as ion milling, chemical etching or reactive ion etching (RIE). The bearing surfaces 250 can be formed by a lapping process.

Additionally, it should be noted that the slider 224 can include one or more stilts 280 (surfaces with "#" surface shading) that extend above the bearing surfaces 250. The stilts section 280 provide a relatively small area of contact between the slider 224 and the storage disk 16 during non-rotation of the storage disk 16 when the slider 224 is resting on the storage disk 16. With this design, the stilts 280 reduce stiction between the slider 224 and the storage disk 16. In FIG. 2, the slider 224 includes six spaced apart stilts 280. Alternatively, the slider 224 could include more than six or less than six spaced apart stilts 280. In one embodiment, each of the stilts 280 is a carbon dot having a height of between approximately 10 and 40 nm above the bearing surfaces 250.

It should be noted that the leading bearing surface 262 in combination with the leading recessed surface 276 provides a region of high pressure near the leading edge 240 of the slider 224 that quickly lifts the leading edge 240 of the slider 224. More specifically, during startup, air is dragged into the leading recessed surface 276 and is forced over the leading bearing surface 262. This causes the slider 224 to take off from the storage disk 16 at a relatively low take-off velocity.

Figure 3:
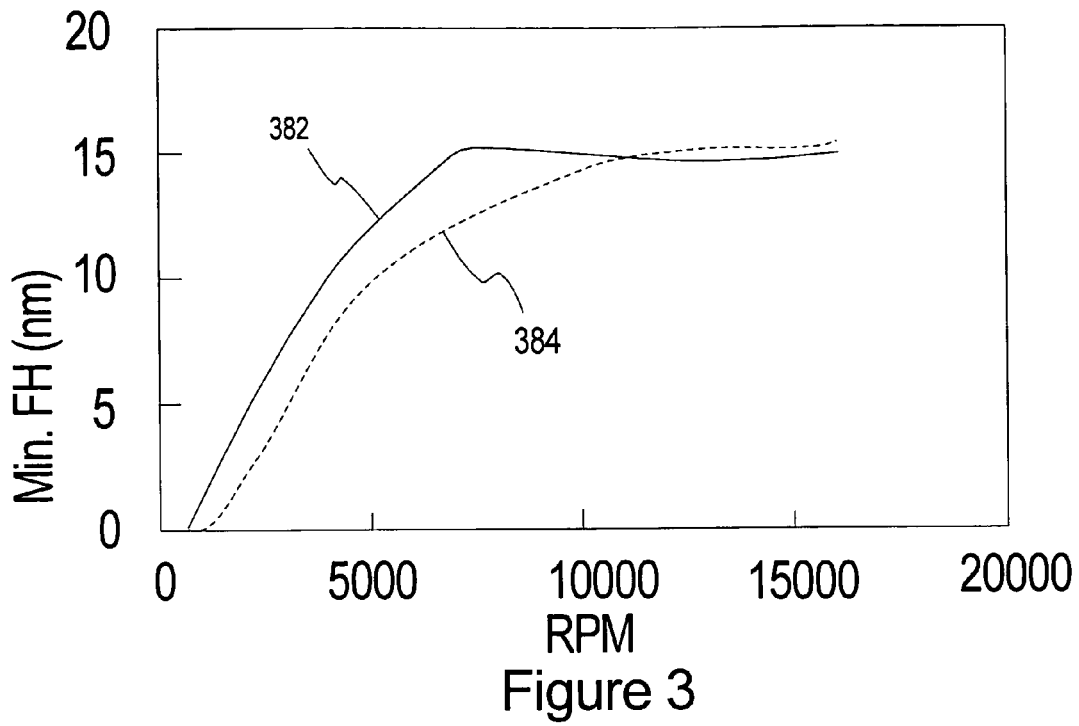
FIG. 3 is a graph that compares the flying height of two sliders at various disk rotation rates.

FIG. 3 is a graph of simulated data that compares the minimum flying height of two sliders at various disk rotation rates when the sliders are positioned over the textured area 27 (illustrated in FIG. 1). More specifically, solid line 382 represents the flying height of the slider 224 illustrated in FIG. 2, and dashed line 384 represents the flying height of a comparative slider (not shown). In this embodiment, the comparative slider is similar to the slider 224 illustrated in FIG. 2, but does not include the leading bearing surface 262 (illustrated in FIG. 2). As a result of not including the leading bearing surface 262 in the comparative slider, the influence of the leading bearing surface 262 on the flying height of the slider 224 can be evaluated.

As illustrated in FIG. 3, the flying height of the slider 224 is higher than the flying height of the comparative slider at rotational velocities under approximately 10,000 RPM. As an example, if the textured area 27 has bumps that are approximately 10 nm, a portion of the slider 224 and the comparative slider are still contacting the bumps when the flying height is below approximately 10 nm. FIG. 3 illustrates that the slider 224 achieves the 10 nm flying height at approximately 4000 RPM while the comparative slider achieves the 10 nm flying height at approximately 5000 RPM. Thus, in this example, the slider 224 has a take-off velocity of approximately 4000 RPM while the comparative slider has a take-off velocity of approximately 5000 RPM.

It should also be noted that during shut down of the disk drive 10 (illustrated in FIG. 1), the slider 224 lands at approximately 4000 RPM while the comparative slider lands at approximately 5000 RPM. This further reduces wear on the slider 224 and the storage disk 16.

In summary, the leading bearing surface 262 causes the slider 224 to take off relatively early and land relatively late. With this design, the leading bearing surface 262 can be used in conjunction with other bearing surfaces to enhance take offs and landings.

Figure 4:
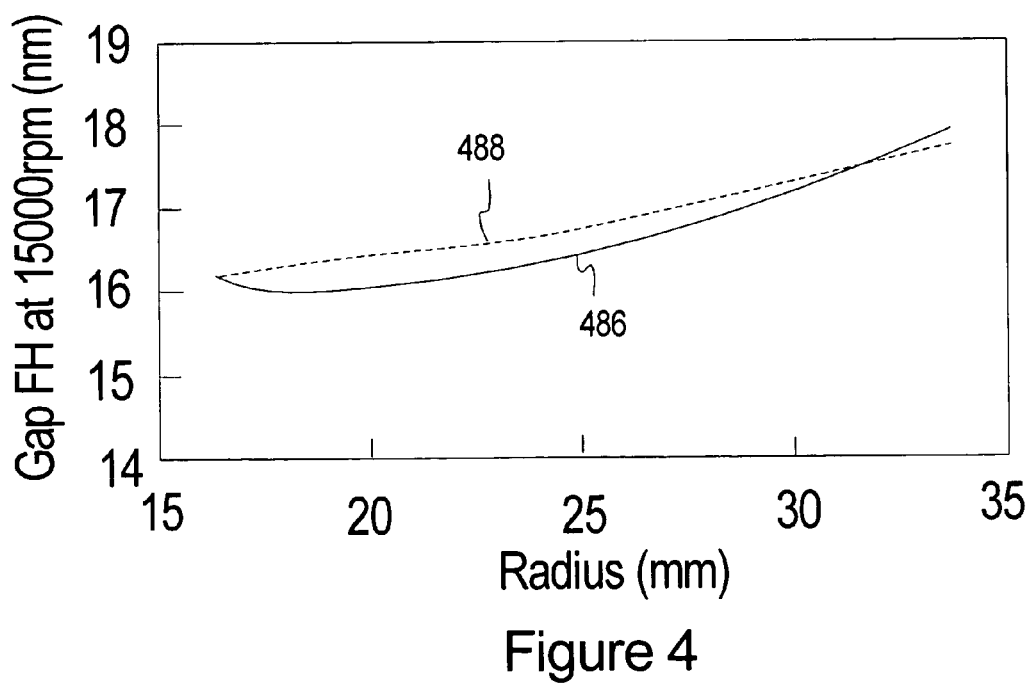
FIG. 4 is a graph that compares the flying height of two sliders at various radial positions.

FIG. 4 is a graph of simulated data that compares the flying height of two sliders at various radial positions relative to a storage disk when the storage disk is rotated at 15000 rpm. More specifically, solid line 486 represents the flying height of the slider 224 illustrated in FIG. 2, and dashed line 488 represents the flying height of the comparative slider (not shown). In this embodiment, the comparative slider is again similar to the slider 224 illustrated in FIG. 2, but does not include the leading bearing surface 262 (illustrated in FIG. 2). As a result of not including the leading bearing surface 262 in the comparative slider, the influence of the leading bearing surface 262 on the flying height of the slider 224 can be evaluated.

As illustrated in FIG. 4, the flying height of the slider 224 is only slightly different that the flying height of the comparative slider at rotational velocities of approximately 15,000 RPM. As a result thereof, the leading bearing surface 262 does not significantly influence the flying characteristics of the slider 224 at rotational velocities of approximately 15,000 RPM.

Figure 5:
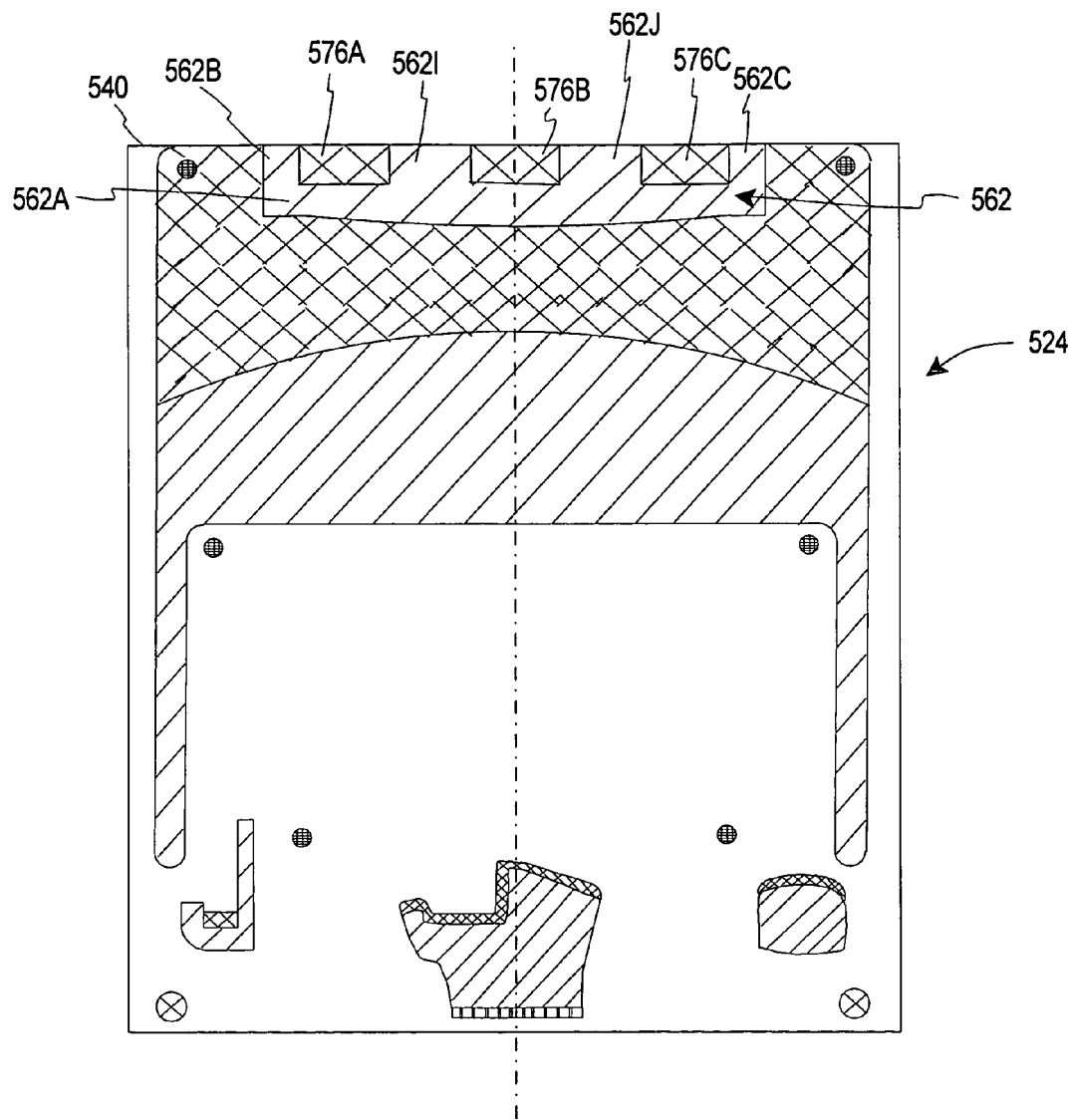
FIG. 5 is a bottom plan view of a second embodiment of a slider having features of the present invention.

FIG. 5 is a simplified, bottom view of another embodiment of the slider 524. In this embodiment, the slider 524 is similar to the slider 224 illustrated in FIG. 2 and described above. However, in this embodiment, the design of the leading bearing surface 562 is slightly different. More specifically, in FIG. 5, the leading bearing surface 562 includes (i) the leading transverse section 562A, (ii) a first lateral section 562I that extends between the leading transverse section 562A and the leading edge 540, (iii) a spaced apart second lateral section 562J that extends between the leading transverse section 562A and the leading edge 540, (iv) the first side section 562B, and (v) the second side section 562C. In this embodiment, the lateral sections 562I, 562J can be positioned between and substantially parallel to the side sections 562B, 562C.

Further, the slider 524 includes a first leading recessed surface 576A, a second leading recessed surface 576B, and a third leading recessed surface 576C that are positioned between the leading transverse section 562A and the leading edge 540.

Figure 6:
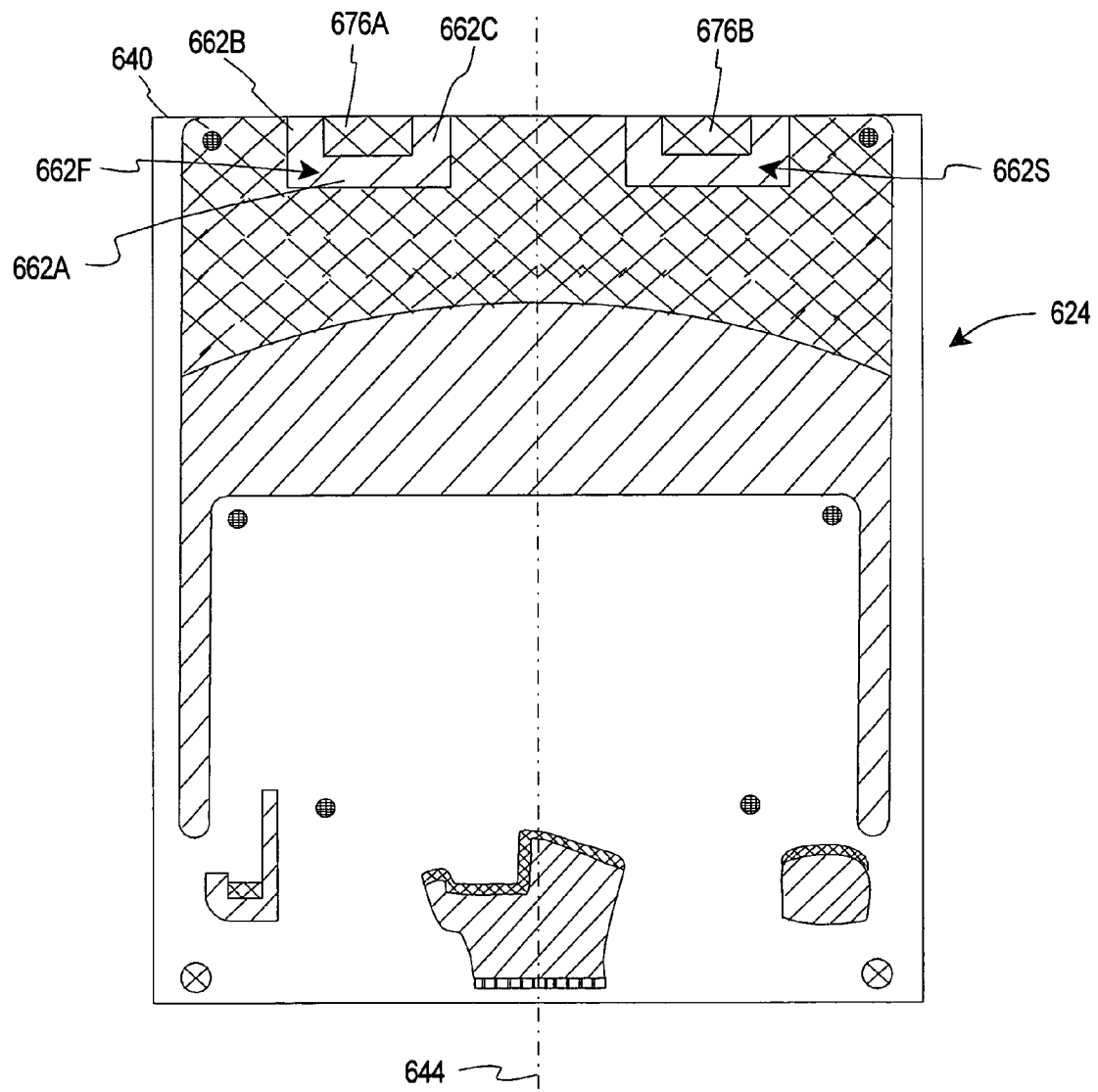
FIG. 6 is a bottom plan view of a third embodiment of a slider having features of the present invention.

FIG. 6 is a simplified, bottom view of yet another embodiment of the slider 624. In this embodiment, the slider 624 is similar to the slider 224 illustrated in FIG. 2 and described above. However, in this embodiment, the slider 624 includes a first leading bearing surface 662F and a spaced apart second leading bearing surface 662S. Further, in FIG. 6, a first leading recessed surface 676A is positioned in front of a portion of the first leading bearing surface 662F and a second leading recessed surface 676B is positioned in front of a portion of the second leading bearing surface 662S.

Moreover, in FIG. 6, each leading bearing surface 662F, 662S includes (i) the leading transverse section 662A, (ii) the first side section 662B, and (iii) the second side section 662C.

Further, as shown in FIG. 6, the leading bearing surfaces 662F, 662S are situated somewhat symmetrical to the longitudinal axis 644 on opposite sides of the longitudinal axis 644. Alternatively, for example, the leading bearing surfaces 662F, 662S can be asymmetrically positioned relative to the longitudinal axis 644.

While the particular sliders 224, 524, 624 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including a leading edge, a trailing edge that is opposite the leading edge, a first leading bearing surface including a leading transverse section that is positioned within approximately 10 and 250 microns of the leading edge, a side section that extends between the leading transverse section and the leading edge and an intermediate transverse bearing surface separated from the first leading bearing surface by an intermediate recessed surface, and a first leading recessed surface positioned between the leading transverse section and the leading edge.

2. The disk drive of claim 1 wherein the first leading bearing surface includes a pair of spaced apart side sections that each extend between the leading transverse section and the leading edge.

3. The disk drive of claim 2 wherein the first leading bearing surface includes a first lateral section that extends between the leading transverse section and the leading edge, the first lateral section being positioned between the side sections.

4. The disk drive of claim 3 wherein the first leading bearing surface includes a second lateral section that extends between the leading transverse section and the leading edge, the second lateral section being positioned between the first lateral section and the second side section.

5. The disk drive of claim 1 wherein the leading transverse section is positioned between approximately 20 and 100 microns of the leading edge.

6. The disk drive of claim 1 wherein the leading transverse section is positioned between approximately 20 and 50 microns of the leading edge.

7. The disk drive of claim 1 wherein the leading transverse section is centered on a longitudinal axis of the slider.

8. The disk drive of claim 1 wherein the first leading bearing surface and the first leading recessed surface cooperate to form a relatively high pressure that facilitates a relatively fast take-off of the slider away from the storage disk during start up of the disk drive.

9. The disk drive of claim 1 further comprising (i) a second leading bearing surface that is spaced apart from the first leading bearing surfaces the second leading bearing surface including a leading transverse section that is positioned within approximately 20 and 200 microns of the leading edge, and (ii) a second leading recessed surface positioned between the leading transverse section and the leading edge.

10. The disk drive of claim 9 wherein the leading bearing surfaces are positioned on opposite sides of a longitudinal axis of the slider.

11. The disk drive of claim 1 wherein the flying side includes a first rear bearing surfaces a second rear bearing surface, and a center rear bearing surface that is positioned between the first rear bearing surface and the second rear bearing surface, wherein the rear bearing surfaces are located near the trailing edge.

12. The disk drive of claim 1 wherein the leading recessed surface is at a step down depth.

13. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including (i) a leading edge, (ii) a trailing edge that is opposite the leading edge, (iii) a first leading bearing surface including a leading transverse section that is spaced apart from the leading edge and a pair of spaced apart side sections that extend from the leading transverse section towards the leading edge, (iv) a first leading recessed surface positioned between the leading transverse section and the leading edge, and (v) an intermediate transverse bearing surface separated from the first leading bearing surface by an intermediate recessed surface, wherein the leading transverse section is positioned within approximately 10 and 250.

14. The disk drive of claim 13 wherein the first leading bearing surface includes a first lateral section that extends between the leading transverse section and the leading edge, the first lateral section being positioned between the side sections.

15. The disk drive of claim 14 wherein the first leading bearing surface includes a second lateral section that extends between the leading transverse section and the leading edge, the second lateral section being positioned between the first lateral section and the second side section.

16. The disk drive of claim 13 wherein the leading transverse section is positioned between approximately 20 and 200 microns of the leading edge.

17. The disk drive of claim 13 wherein the leading transverse section is positioned between approximately 20 and 100 microns of the leading edge.

18. The disk drive of claim 13 wherein the leading transverse section is centered on a longitudinal axis of the slider.

19. The disk drive of claim 13 wherein the first leading bearing surface and the first leading recessed surface cooperate to form a relatively high pressure that facilitates a relatively fast take-off of the slider away from the storage disk during start up of the disk drive.

20. The disk drive of claim 13 further comprising (i) a second leading bearing surface that is spaced apart from the first leading bearing surface, the second leading bearing surface including a leading transverse section that is spaced apart from the leading edge and a pair of spaced apart side sections that extend from the leading transverse section towards the leading edge, and (ii) a second leading recessed surface positioned between the leading transverse section and the leading edge.

21. The disk drive of claim 20 wherein the leading bearing surfaces are positioned on opposite sides of a longitudinal axis of the slider.

22. The disk drive of claim 13 wherein the flying side includes a first rear bearing surface, a second rear bearing surface, and a center rear bearing surface that is positioned between the first rear bearing surface and the second rear bearing surface, wherein the rear bearing surfaces are located near the trailing edge.

23. The disk drive of claim 13 wherein the leading recessed surface is at a step down depth.

24. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including (i) a leading edge, (ii) a trailing edge that is opposite the leading edge, (iii) a first leading bearing surface including a leading transverse section that is positioned between approximately 20 and 200 microns of the leading edge and a pair of spaced apart side sections that extend from the leading transverse section towards the leading edge, (iv) a first leading recessed surface positioned between the leading transverse section and the leading edge, and (v) an intermediate transverse bearing surface separated from the first leading bearing surface by an intermediate recessed surface, wherein the first leading bearing surface and the first leading recessed surface cooperate to form a relatively high pressure that facilitates a relatively fast take-off of the slider away from the storage disk during start up of the disk drive.

25. The disk drive of claim 24 wherein the first leading bearing surface includes a first lateral section that extends between the leading transverse section and the leading edge, the first lateral section being positioned between the side sections.

26. The disk drive of claim 25 wherein the first leading bearing surface includes a second lateral section that extends between the leading transverse section and the leading edge, the second lateral section being positioned between the first lateral section and the second side section.

27. The disk drive of claim 24 wherein the leading transverse section is positioned between approximately 20 and 100 microns of the leading edge.

28. The disk drive of claim 24 wherein the leading transverse section is centered on a longitudinal axis of the slider.

29. The disk drive of claim 24 further comprising (i) a second leading bearing surface that is spaced apart from the first leading bearing surface, the second leading bearing surface including a leading transverse section that is spaced apart from the leading edge and a pair of spaced apart side sections that extend from the leading transverse section towards the leading edge, and (ii) a second leading recessed surface positioned between the leading transverse section and the leading edge.

30. The disk drive of claim 29 wherein the leading bearing surfaces are positioned on opposite sides of a longitudinal axis of the slider.

31. The disk drive of claim 24 wherein the flying side includes a first rear bearing surface: a second rear bearing surface, and a center rear bearing surface that is positioned between the first rear bearing surface and the second rear bearing surface, wherein the rear bearing surfaces are located near the trailing edge.

32. The disk drive of claim 24 wherein the leading recessed surface is at a step down depth.

* * * * *

UNITED STATES PATENT AND TRADEMARK OFFICE
CERTIFICATE OF CORRECTION

PATENT NO.       : 7,643,251 B1                                          Page 1 of 1
APPLICATION NO.  : 11/483072
DATED            : January 5, 2010
INVENTOR(S)      : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this

Sixteenth Day of November, 2010

David J. Kappos
*Director of the United States Patent and Trademark Office*